United States Patent
Ozluturk et al.

(10) Patent No.: US 6,744,756 B2
(45) Date of Patent: *Jun. 1, 2004

(54) SYSTEM FOR DETECTING SHORT CODES

(75) Inventors: Fatih M. Ozluturk, Port Washington, NY (US); Alexander M. Jacques, Kings Park, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 24 days.

This patent is subject to a terminal disclaimer.

(21) Appl. No.: 10/188,279

(22) Filed: Jul. 1, 2002

(65) Prior Publication Data

US 2002/0181433 A1 Dec. 5, 2002

Related U.S. Application Data

(63) Continuation of application No. 09/415,321, filed on Oct. 8, 1999, now Pat. No. 6,414,951.

(51) Int. Cl.[7] .................. H04B 7/216; H04B 15/00; H04K 1/00
(52) U.S. Cl. .................. 370/342; 375/145; 375/149
(58) Field of Search .................. 370/342; 375/142, 375/143, 150, 152, 147–149, 130, 144–145

(56) References Cited

U.S. PATENT DOCUMENTS

| | | | |
|---|---|---|---|
| 5,309,474 A | 5/1994 | Gilhousen et al. | 375/142 |
| 5,642,377 A * | 6/1997 | Chung et al. | 375/145 |
| 5,673,260 A | 9/1997 | Umeda et al. | 370/342 |
| 5,748,687 A | 5/1998 | Ozluturk et al. | 375/367 |
| 5,796,776 A | 8/1998 | Lomp et al. | 375/222 |
| 5,799,010 A | 8/1998 | Lomp et al. | 370/335 |
| 5,841,768 A | 11/1998 | Ozluturk et al. | 375/130 |
| 6,205,168 B1 * | 3/2001 | Somayazulu | 375/149 |
| 6,414,951 B1 * | 7/2002 | Ozluturk et al. | 370/342 |

OTHER PUBLICATIONS

"Pipelined Sequential Acquisition in a Direct Sequence Spread Spectrum Communication System", Proceedings of the 1997 IEEE International Conference on Personal Wireless Communications, Dec. 1997.*

* cited by examiner

*Primary Examiner*—Seema S. Rao
*Assistant Examiner*—Kevin C. Harper
(74) *Attorney, Agent, or Firm*—Volpe and Koenig, P.C.

(57) ABSTRACT

A system employing CDMA techniques for receiving a transmitted signal wherein the transmitted signal includes a plurality of short codes, each of which is transmitted repetitively over a fixed period of time and where the received signal has CW interference in addition to the transmitted signal. The system detects the presence of the short code in a plurality of time phases of the received signal by calculating a likelihood ratio for each phase. The likelihood ratio takes into account the current short code.

18 Claims, 7 Drawing Sheets

SYSTEM FOR DETECTING SHORT CODES

CROSS REFERENCE TO RELATED APPLICATIONS

This application is a continuation of application Ser. No. 09/415,321, filed Oct. 8, 1999 now U.S. Pat. No. 6,414,951, which application is incorporated herein by reference.

BACKGROUND OF THE INVENTION

1. Field of the Invention

This invention relates to the field of code division multiple access (CDMA) communication systems. More particularly, the present invention relates to a system for accurately detecting short codes in a communication environment which includes continuous wave interference.

2. Description of Prior Art

With the dramatic increase in the use of wireless telecommunication systems in the past decade, the limited portion of the RF spectrum available for use by such systems has become a critical resource. Wireless communications systems employing CDMA techniques provide an efficient use of the available spectrum by accommodating more users than time division multiple access (TDMA) and frequency division multiple access (FDMA) systems.

In a CDMA system, the same portion of the frequency spectrum is used for communication by all subscriber units. Typically, for each geographical area, a single base station serves a plurality of subscriber units. The baseband data signal of each subscriber unit is multiplied by a pseudorandom code sequence, called the spreading code, which has a much higher transmission rate than the data. Thus, the subscriber signal is spread over the entire available bandwidth. Individual subscriber unit communications are discriminated by assigning a unique spreading code to each communication link. At times it is also useful in a CDMA system to transmit codes which are of shorter length than the usual spreading code.

It is known in the art of CDMA communication systems to use a sequential probability ratio test (SPRT) detection method to detect the transmission of a short code. However, in the presence of continuous wave (CW) interference, the use of known SPRT detection methods can result in a large number of false short code detections. These false detections degrade system performance by delaying the detection of valid short codes.

A background noise estimation is required for the SPRT detection method. The background noise estimation is typically performed by applying a long pseudo-random spreading code to a RAKE despreader. The output of the RAKE despreader has a probability distribution function, (PDF). Referring to FIG. 1A, curve 1 shows a typical PDF background for noise which is calculated using a long pseudo-random spreading code where there is no CW interference. Curve 3 shows a typical PDF in the presence of a valid detected signal. However, when CW interference is present during the transmission of short codes, the background noise PDF is a curve like 2, which is shifted away from curve 1 and which appears similar to the PDF for a valid detected signal, curve 3. The noise estimate becomes skewed because the short code, which is not completely random is applied to the RAKE and it begins to correlate with the repetitive CW interference. Accordingly, as curve 2 shifts further toward curve 3 due to the presence of CW interference, the SPRT detection method will falsely detect invalid noise as a valid signal.

Referring to FIG. 1B, there is shown a block diagram of a prior art short code detector system 10. The short code detector system 10 is typically located in a base station for detecting short codes received from a subscriber unit. A signal containing short codes, continuous wave interference and other forms of background noise is applied to the short code detector system 10 by way of the detector input line 12, and is received by a detector input block 14. The detector input block 14 includes a RAKE demodulator having M different phases. The RAKE demodulator operates on the input signal by combining it with the short pilot code. The pilot code is a pseudorandom code which is generated locally by the base station and transmitted by subscribers initiating a call setup.

A first output signal of the detector input block 14 is applied to a detection block 16 of the detector system 10. The detection block 16 contains a SPRT detection method. The output signal of the detection block 16 appears on a decision line 20. The signal of the decision line 20 represents a decision by the SPRT detection method of detection block 16 whether a short code is present in the signal received by the input block 14.

A second output signal of the input block 14 is applied to a noise estimator, which is comprised of a separate RAKE demodulator (AUX RAKE) which uses a long pseudorandom code in combination with the input signal to perform a background noise estimation. The result of the background noise estimation performed in block 18 is a PDF which is applied to the SPRT detection method of detection block 16.

Referring now to FIG. 2, there is shown prior art short code detection method 40. The detection method 40 is used to detect the presence of short codes transmitted in a wireless communication system. For example, the short code detection method 40 is suitable for operation within the detection block 16 of the short code detector system 10 to detect the presence of short codes in the input signal of the input line 12.

Execution of the short code detection method 40 begins at the start terminal 42 and proceeds to step 44 where one of the M different phases of the RAKE 14 is selected. The short code detection method 40 proceeds to step 46 where a background noise estimate, performed by the AUX RAKE, (in the noise estimator 18 of FIG. 1B), is updated. The signal is applied by the noise estimator 18 to the detection block 16. At step 50, a sample of the signal from the selected phase of the input line 12 as received by the input block 14 is applied to the detection block 16 for computation according to the short code detection method 40.

Referring now to FIG. 3A, there is shown a graphical representation 70 of the operation of the short code detection method 40. An acceptance threshold 74 and a rejection threshold 76 are set forth within along with two likelihood ratios 80, 84. A likelihood ratio is a decision variable that is well known to those skilled in the art. It is useful when determining the presence of a signal in a communication system. The likelihood ratios 80, 84 have starting values approximately midway between the thresholds 74, 76. They are repeatedly adjusted by the short code detection method 40 for comparison with thresholds 74, 76 in order to determine the presence of short codes.

Although, the starting values of the likelihood ratios 80, 84 are approximately midway between the thresholds 74, 76, adjustments are made to the likelihood ratios 80, 84 which can be positive or negative as determined by the calculations of the detection method 40. As the likelihood ratio of a phase increases and moves in the direction of the acceptance threshold 74, there is an increasing level of confidence that a short code is present. When a likelihood ratio crosses the acceptance threshold 74 the level of confidence is sufficient to determine that a short code is present in the phase. As the likelihood ratio decreases and moves in the direction of the rejection threshold 76, there is an increasing level of confidence that a short code is not present in the phase. When a likelihood ratio crosses the rejection threshold 76, the level of confidence is sufficient to determine that no short code is present.

Returning to FIG. 2 the likelihood ratio of the current phase is updated at step 54. It will be understood by those skilled in the art that such a likelihood ratio is calculated for each of the M different phases of the RAKE. The likelihood ratio of the current phase is calculated in view of the background estimate of step 46 and the input sample taken at step 50.

At step 56, a determination is made whether the likelihood ratios of all M phases are below the rejection threshold 76. If even one of the likelihood ratios is above the rejection threshold 76 it is possible that a short code is present in the received transmission. In this case, execution of short code detection method 40 proceeds to step 58. At step 58, a determination is made whether any of the likelihood ratios calculated by the detection method 40 is above the acceptance threshold 74. If any likelihood ratio is above acceptance threshold 74, as determined by step 58, a determination is made that a short code is present step 60.

If the detection method 40 operates within the detection block 16 of the short code detector system 10 this determination can be indicated by means of the decision line 20.

If all of the likelihood ratios are below the rejection threshold 76 as determined by step 56, it is possible to be confident that no short code is present in any of the M phases of the received signal. Accordingly, the detection method 40 proceeds to step 52 where the likelihood ratios of all M phases are cleared. The phase of the local spreading code, the pilot code, is advanced in step 48 for use with the RAKE and the next RAKE phase is selected in step 44

If a likelihood ratio is above the rejection threshold 76 but no likelihood ratio is above the acceptance threshold 74, as determined by step 58, the detection method 40 proceeds by way of path 59 whereby a new sample of the signal phase is obtained, (step 50). The repeated branching of the detection method 40 by way of path 59 to obtain and process new samples in this manner causes the adjustment of the various likelihood ratios either toward or away from thresholds 74, 76. The short code detection method 40 repeatedly proceeds by way of path 59 until either: 1) one of the likelihood ratios crosses above the acceptance threshold 74; or 2) all of the likelihood ratios cross below the rejection threshold 76. Only when one of these two events occurs is there a sufficient confidence level to determine whether or not a short code is present. The number of samples required for one of these two events to occur is a measure of the efficiency of the short code detection method 40.

Repeated branching by way of path 59 can provide either an increasing likelihood or a decreasing likelihood that a short code is present. For example, in the case of the first likelihood ratio 80 shown in FIG. 3A, the repeated branching by way of path 59 causes adjustment of likelihood ratio 80 generally in the direction of the rejection threshold 76. When continued performance of the operations of the detection method 40 causes the likelihood ratio 80 to cross the rejection threshold 76, there is a high enough confidence level to determine that no short code is present within the current phase. Repeated branching by way of path 59 can also provide an increasing likelihood that a short code is present. For example, in the case of the second likelihood ratio 84 shown in FIG. 3A, successive samples cause adjustment of the likelihood ratio 84 generally in the direction of the acceptance threshold 74. When continued branching by way of path 59 causes the likelihood ratio 84 to cross the acceptance threshold 74, there is a high enough confidence level to determine that a short code is present within the current phase.

FIG. 7 is a plot of the average number of samples required when employing the detection method 40 to acquire a short code in the presence of CW interference. The plot demonstrates that the number of samples required to acquire a short code increases dramatically when the amplitude of CW interference is greater than 0.2 times the magnitude of the background noise. The drop in the number of samples shown for CW interference greater than 0.6 times the magnitude of the background noise does not indicate improved short code detection performance, but rather, it reflects the fact that false detections begin occurring at this point.

As shown in FIG. 7, low levels of CW background interference increase short code acquisition time when using a conventional SPRT method, such as detection method 40. Additionally, higher levels of CW interference cause false detections of short codes, which also result in an unacceptably long acquisition time to detect a valid short code. The applicant has recognized a need for a short code detection method that can reliably and quickly detect the presence of short codes in a CDMA transmission that contains CW background noise.

SUMMARY OF THE INVENTION

A method is disclosed for receiving a transmitted signal in a communication system employing CDMA techniques wherein the transmitted signal includes a plurality of short codes, each of which is transmitted repetitively over a fixed period of time. The method is particularly useful in rejecting CW interference which may be received with the transmitted signal. The method includes using a SPRT for detecting the presence of the short code in a plurality of phases of the received signal by calculating a likelihood ratio for each phase. For each signal phase examined, the likelihood ratio is updated until its value either reaches a threshold that is consistent with the presence of a detected short code or reaches a threshold that is consistent with the absence of a short code. A likelihood ratio is a comparison of the signal's Probability Distribution Function (PDF) with a background noise PDF. The PDFs are calculated by passing the signal through a RAKE despreader. The background noise PDF is calculated by combining in the RAKE the current short pilot code with the input signal. A new background noise PDF is calculated when the pilot code changes.

DETAILED DESCRIPTION OF THE DRAWINGS

Figure 1A:
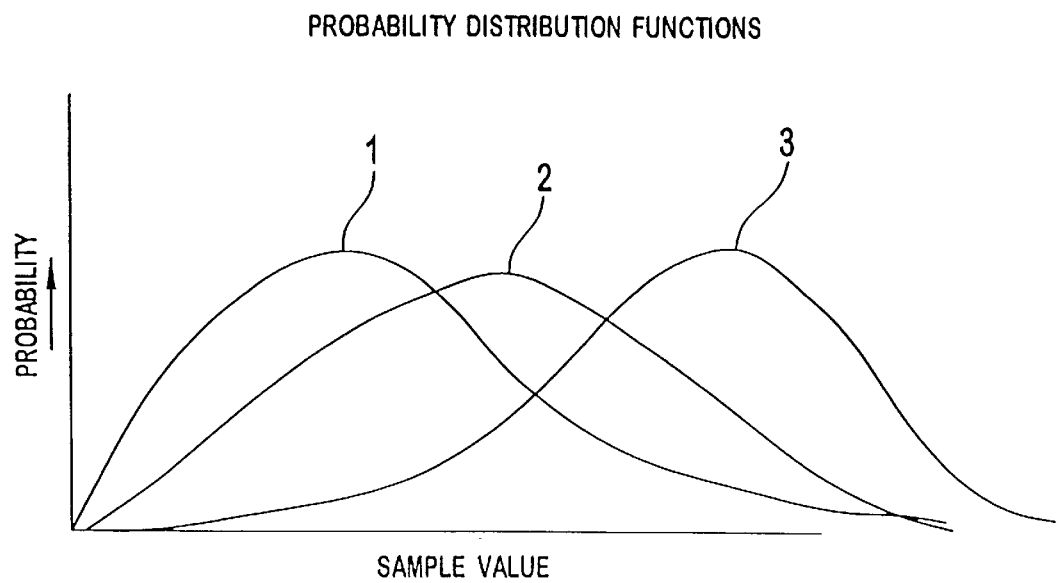
FIG. 1A is the probability distribution functions for received signals and for background noise.
Figure 1B:
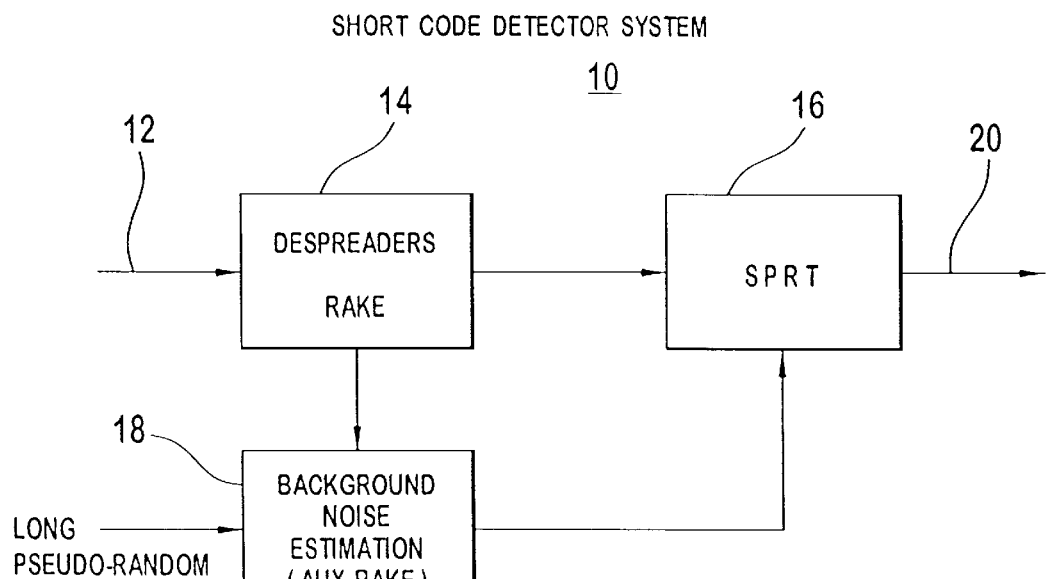
FIG. 1B is a prior art short code detector system.
Figure 2:
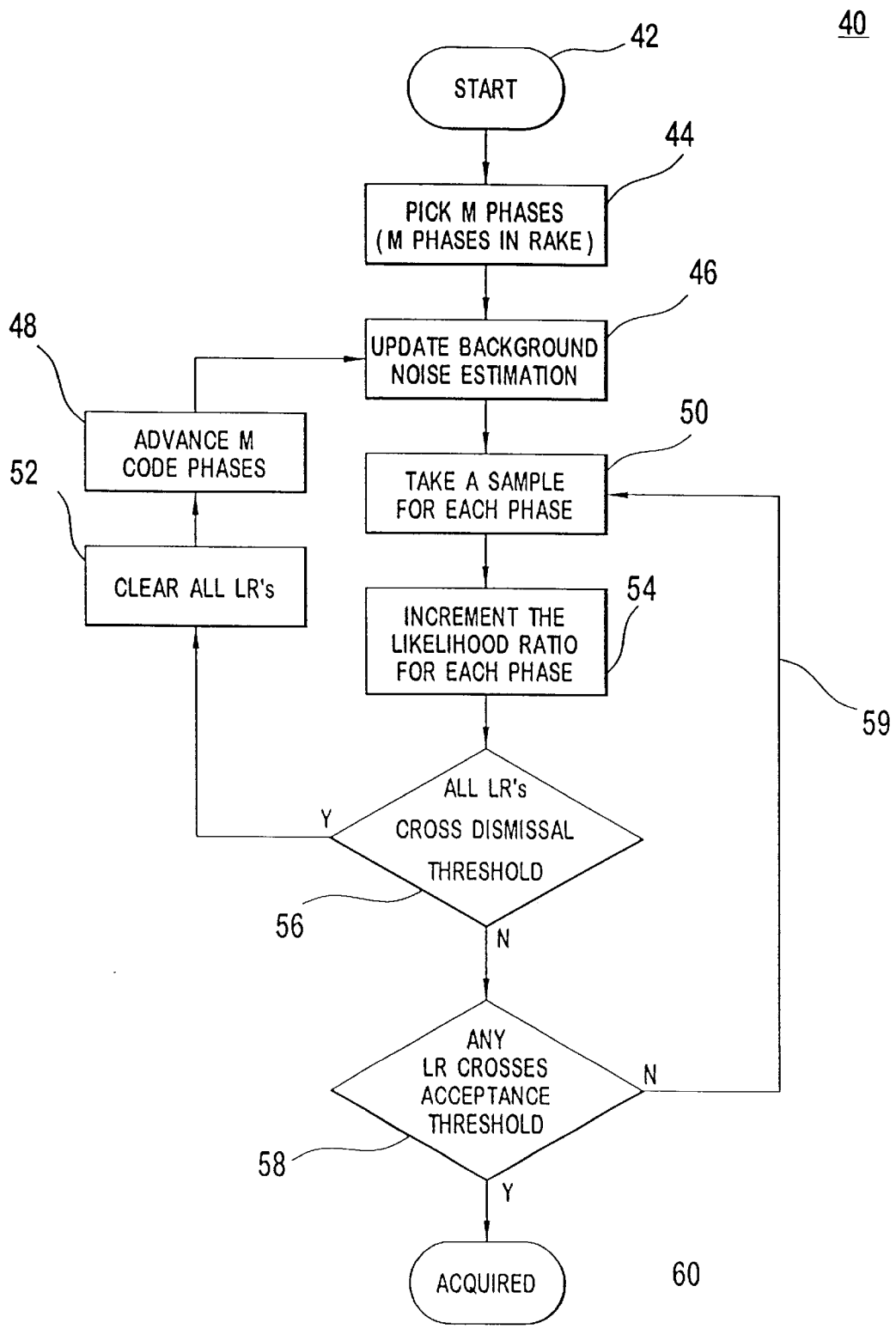
FIG. 2 is a flow chart of a prior art short code detection method suitable for use in short code detection using the short code detector system of FIG. 1B.

The present invention will be described with reference to the drawing figures wherein like numerals represent like elements throughout.

Figure 4A:
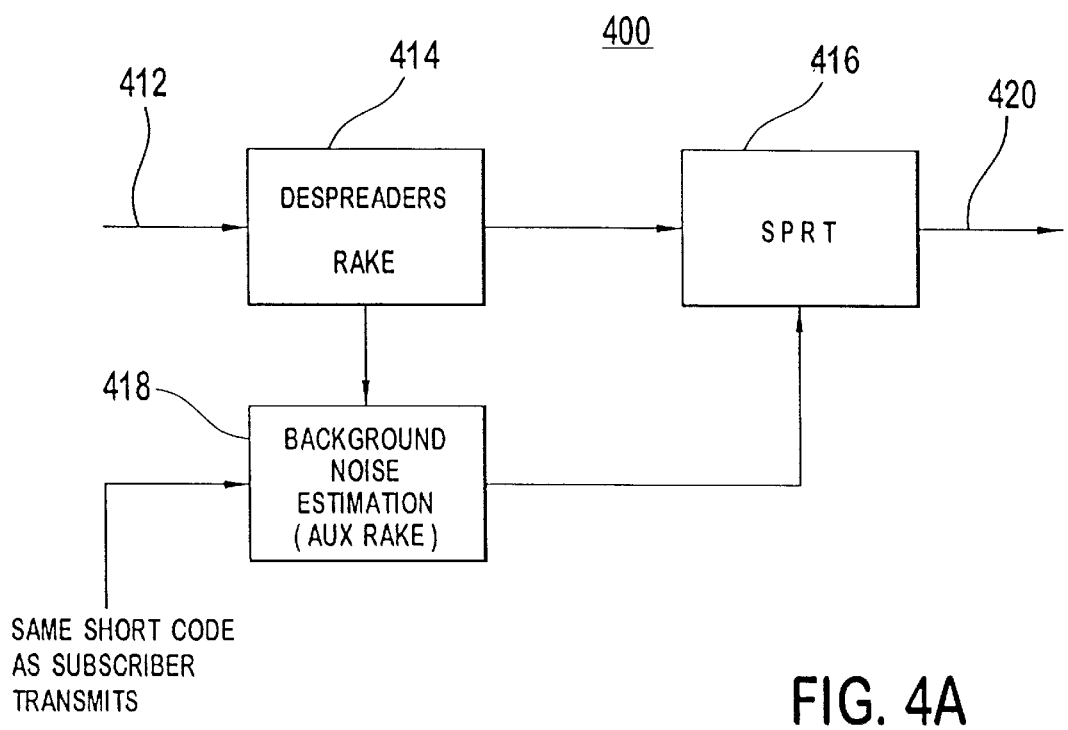
FIG. 4A is the preferred embodiment of the present invention.

Referring to FIG. 4A, there is shown a block diagram representation of the short code detector system 400 of the present invention. A signal containing short codes, continuous wave interference and other forms of background noise is applied to the short code detector system 400 by way of a detector input line 412 and is received by a detector input block 414. The detector input block 414 includes a RAKE demodulator having M different phases.

A first output signal of the detector input block 414 is applied to a detection block 416 of the detector system 400. The detection block 416 contains a SPRT detection method. The output signal of the detection block 416 appears on a decision line 420. The signal of the decision line 420 represents a decision by the SPRT detection method of the detection block 416 whether a short code is present in the signal received by the input block 414. A second output signal of the detector input block 414 is applied to a noise estimator 418, which includes a separate RAKE demodulator (AUX RAKE) which uses the same short code being transmitted by the subscriber. As will be explained in detail hereinafter, the body and noise estimate is used by the SPRT detection method in the detection block 416 to more accurately detect the presence of a valid signal code.

Figure 4B:
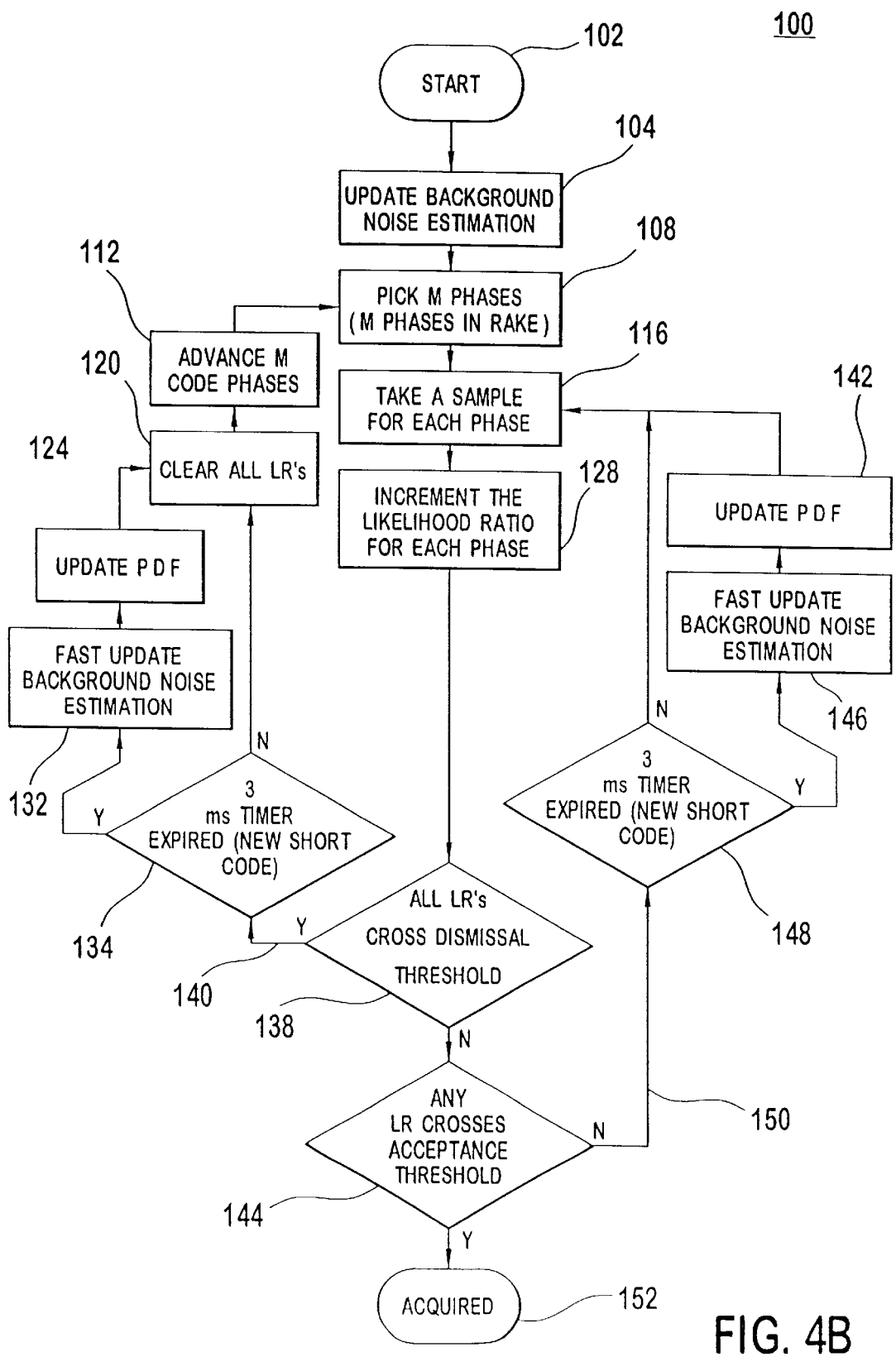
FIG. 4B is a flow chart of the short code detection method of the present invention.

Referring to FIG. 4B, there is shown a short code detection method 100 in accordance with the present invention. The short code detection method 100 can be used in a short code detection system 400 shown in FIG. 4A to detect the presence of short codes 88a–c within the various phases of a received signal. Execution of the short code detection method 100 begins at step 102 and proceeds to step 104 where a background noise estimate is performed. The background noise estimate is calculated by combining in the RAKE 414 the input signal with the short code; which is the same short code being used by subscriber to initiate call setup to the base station.

Figure 3A:
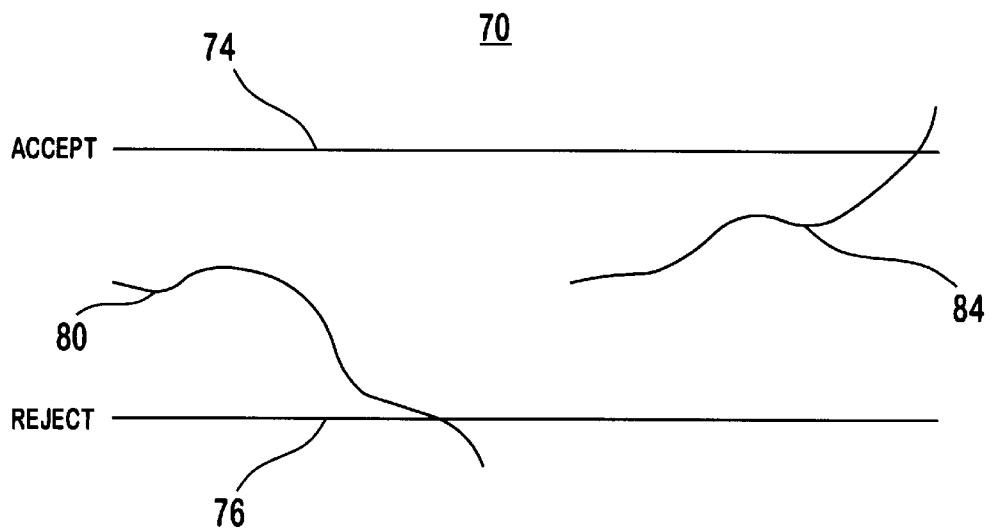
FIG. 3A is the likelihood ratios and decision thresholds suitable for use in a short code detection method.
Figure 3B:
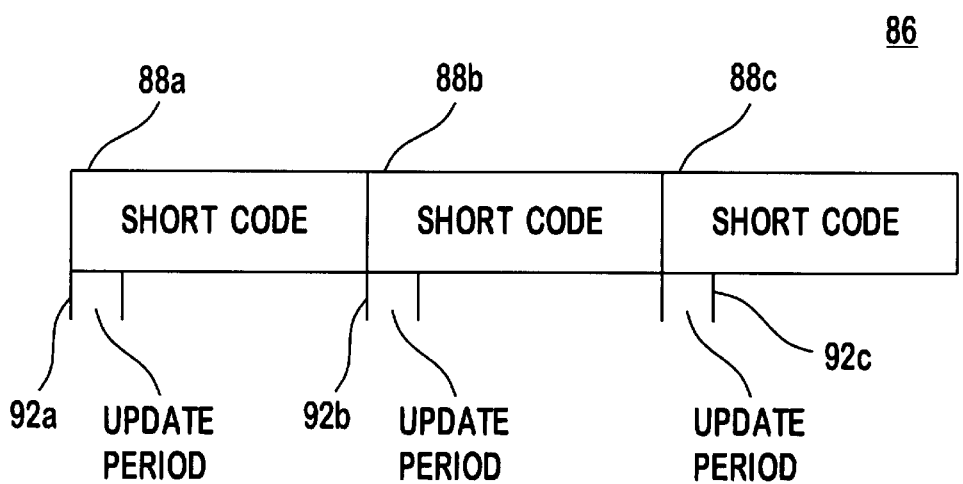
FIG. 3B is a block diagram of short codes.

Referring to FIG. 3B, there is shown a block diagram 86 of the short codes 88a–c which are used by the subscriber for transmission to the base station. For example, a first short code 88a is used for a 3 millisecond duration as the input to the pilot RAKE. If the pilot signal has not been detected by the base station within that 3 millisecond time period, the short code 88a is updated to a new short code 88b. An update period 92b is necessary to update the code. Short codes are updated every 3 millisecond to avoid any unexpected unfavorable cross correlation effects.

As will be explained in detail hereinafter, a new background noise estimate is calculated each time the short code 88a–c used for the detection of the pilot code changes. The use of periodically updated short codes by the present invention to estimate background noise produces a PDF that more closely resembles the actual background noise, even in the presence of continuous wave interference. Accordingly, as shown in FIG. 1A, curve 2 which represents the background noise in the presence of CW interference is more readily distinguished from curve 3 which represents a valid signal.

Referring to step 108, a plurality of phases M of the RAKE 14 is selected and a signal sample for each phase is obtained at step 116. The input (received) signal is despread using M different phases of the short pilot code at the RAKE. In the present invention, the preferred number of phases M of the RAKE 14 is eight. However, it should be understood that any number may be selected The likelihood ratio for each of the M phases is calculated at step 128, according to the background noise estimation of step 104 and the new samples of step 116. Since the preferred embodiment of the present invention utilizes eight phases of the RAKE 14, calculations are performed in parallel for each phase. Accordingly, eight separate likelihood ratios are calculated and maintained. A determination is made at step 138 whether the likelihood ratios of all M phases are below the rejection threshold 76. If the determination 138 is negative, a short code may be present in at least one of the M phases. In this case, a further determination 144 is made whether any of the likelihood ratios is above the acceptance threshold 74. If the determination 144 is affirmative, a short code is present and execution of short code detection method 100 proceeds to step 152 which indicates that the pilot signal has been acquired.

If all of the likelihood thresholds are below the rejection threshold 76, as determined at step 138, there is a high enough confidence level to determine that no short codes are present in any of the current M phases. Under these circumstances, the detection method 100 proceeds by way of branch 140 to step 134. At step 134 a determination is made whether a three millisecond time period has expired.

The three millisecond time period at decision step 134 is synchronized with changes in the short codes used by the subscriber unit to acquire the pilot signal. The use of the three millisecond time period in the present specification is by way of example only. Those of skill in the art should realize that the time period used to update the short codes for acquiring the pilot signal is the same time period that will be used in accordance with the present inventive method to update the background noise. The specific time period is not central to the present invention.

If the three millisecond timer has not expired, as determined at decision step 134, detection continues using the same background estimation. Under these circumstances execution of the short code detection method 100 proceeds directly to step 120 where all of the likelihood ratios for the current M phases are cleared. The code phase is then advanced at step 112 and M new phases are processed, thereby repeating step 108 and the short code detection method 100.

If the three millisecond time period has expired, as determined by step 134, the timer is reset and a fast update of the background noise estimate is performed as shown at step 132. The background noise estimate is performed in the manner previously described for step 104, using the new short code. The expiration of the 3 millisecond time period coincides with the use of a new short code.

Referring back to FIG. 3B, since each short code 88a–c has a respective update period 92a–c at the beginning of the use of a new short code 88a–c, the background noise estimation update set forth at step 132 is performed during the respective update period 92a–c for that short code. The sample of step 132 should be obtained very quickly after the time period expires. In the preferred embodiment of the invention the sample is obtained within a few symbol periods of the use of a new short code 88a–c.

This inventive method for updating the background noise results in performing the operations of short code detection method 100 upon a set of samples having a noise estimation using the same short code time slot as the sample. The use of a noise estimation from the same time slot as the sample improves the accuracy of short code detection method 100. The background noise estimate is used to update a background noise PDF in step 124. At step 120 all likelihood ratios are cleared. The local code phase is advanced at step 112 and a new phase and a new sample are processed, thereby repeating step 108 and beginning the short code detection method 100 again.

Referring back to FIG. 4B if a likelihood ratio is above rejection threshold 76 but no likelihood ratios are above acceptance threshold 74, as determined by step 144, execution of the short code detection method 100 proceeds by way of branch 150 to step 148. At step 148 a determination, is made whether the three millisecond time period has expired. If the three millisecond time period has not expired, the detection method 100 continues to operate with the current background noise estimate, and a new sample for each of the M phases is taken at step 116. If the three millisecond time period has expired, this indicates that a new short code is being used. Accordingly, the timer is reset and a fast update of the background noise is performed in block 146, the background noise estimate is adjusted in step 142, and a new sample for each phase is taken at step 116.

As described above, the three millisecond time period is tested during every pass through the detection method 100, whether execution of detection method 100 passes by way of branch 140 where all current likelihood ratios have crossed the dismissal threshold, or when execution passes by way of branch 150 where no current likelihood ratios have passed the acceptance threshold.

Figure 5:
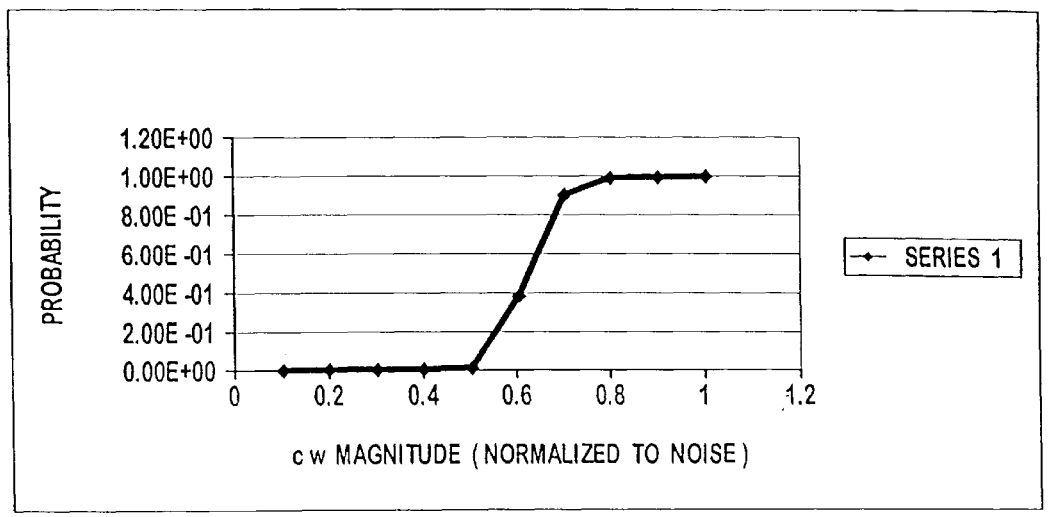
FIG. 5 is a graph of the probability of false alarm performance of the prior art short code detection method of FIG. 1.

Referring to the graph 180 of FIG. 5, the graph 180 sets forth the probability of a false acquisition by prior art short code detection method 40 for a plurality of values of CW magnitudes. The probability of a false acquisition by the prior art short code detection method 40 begins rising sharply when the CW interference is 0.5 times the normalized value of the background noise and reaches one hundred percent when CW is at 0.8 times the value of the background noise.

Figure 6:
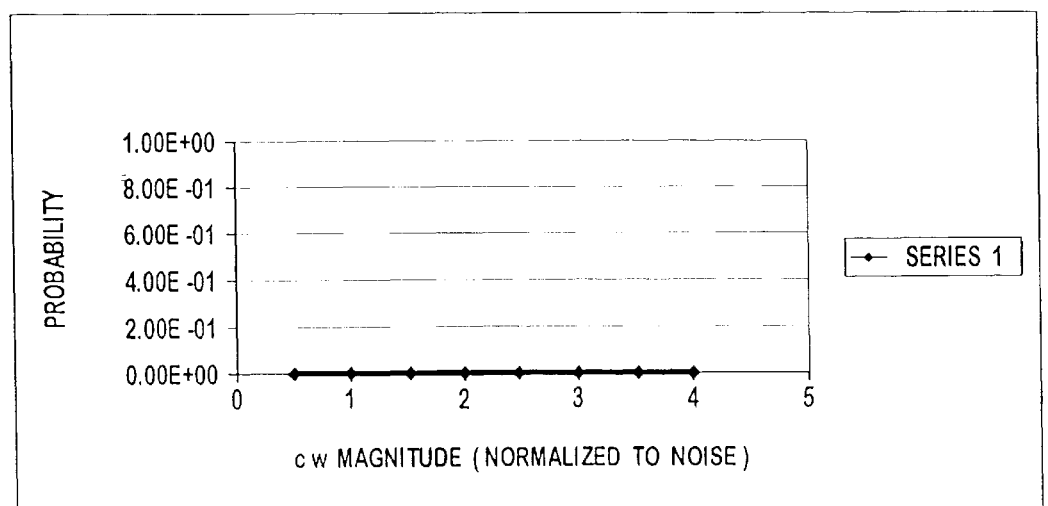
FIG. 6 is a graph of the probability of false alarm performance of the short code detection method of FIG. 4.

However, referring to FIG. 6, a second graph 200 sets forth the probability of a false acquisition by the present inventive short code detection method 100 for a plurality of continuous wave magnitudes. As shown, the probability of a false acquisition by the short code detection method 100, is substantially zero even where CW interference is a large as 4 times the value of the background noise. Thus, the present invention provides a substantial improvement in false acquisition performance over the prior art short code detection method 40.

Figure 7:
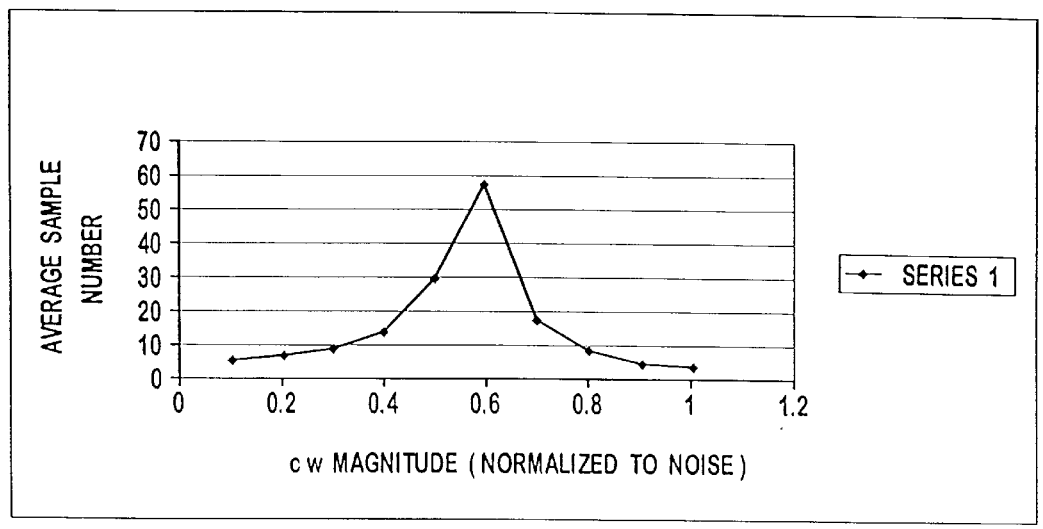
FIG. 7 is a graph of the average sample number performance of the prior art short code detection method of FIG. 1.
Figure 8:
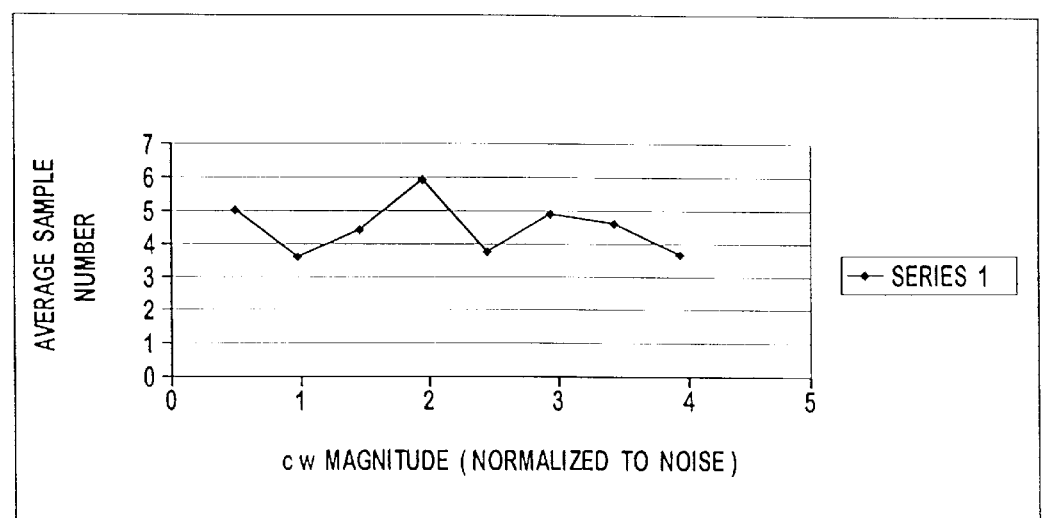
FIG. 8 is a graph of the average sample number performance of the short code detection method of FIG. 4.

Referring now to FIGS. 7 and 8, two graphs are shown 220, 240 which set forth the average sample number required by the short code detection methods 40, 100 to determine whether a short code is present. It will be understood by those skilled in the art that the smaller the number of samples required to make this determination, the better the method performs. As continuous wave interference magnitude increases, the prior art short code detection method 40 requires substantially more samples in order to detect a short code. As shown in FIG. 7 the average sample number can increase by an order of magnitude as the magnitude of the CW interference is increased. The drop in the number of samples shown in graph 220 for CW interference greater than 0.6 times the magnitude of the background noise does not indicate improved short code detection performance, but rather it reflects the fact that false detections begin occurring at this point.

In contrast, as shown in FIG. 8, the average sample number required by the present inventive detection method 100 remains substantially constant over a wide range of continuous wave magnitudes. Furthermore, the required number of samples for the detection method 100 remain substantially lower for CW magnitudes that are much higher than those causing the sharp rise in sample numbers for the prior art detection method 40. False indications of short codes are virtually eliminated by the present invention.

The previous description of the preferred embodiments is provided in order to enable those skilled in the art to make and use the present invention. The various modifications to the embodiments shown will be readily apparent to those skilled in the art, and the generic principles defined herein can be applied to other embodiments without providing an inventive contribution. Thus, the present invention is not intended to be limited to the embodiments shown but is to be accorded the widest scope consistent with the principles and features disclosed.

What is claimed is:

1. A system for receiving a transmitted signal which includes at least one short code which is periodically updated; the system comprising:

a despreader for receiving and despreading said transmitted signal to output a despread signal;

a background noise estimator for obtaining a background noise estimation using said at least one periodically updated short code; and a decision unit, which receives said despread signal and said background noise estimate, calculates a value representing the likelihood that a short code has been detected and compares said value with a predetermined threshold; whereby the decision unit confirms the detection of said short code if said value exceeds said predetermined threshold.

2. The system of claim 1, whereby the decision unit further compares said value with a plurality of predetermined thresholds, whereby at least one of said predetermined thresholds is an acceptance threshold and at least one of said predetermined thresholds is a rejection threshold.

3. The system of claim 2, whereby the transmitted signal has a plurality of signal phases, and whereby the decision unit compares a plurality of values, corresponding to the plurality of signal phases, with the plurality of predetermined thresholds.

4. The system of claim 3, whereby the decision unit advances the signal phase if one of said plurality of values crosses one of said plurality of predetermined thresholds.

5. The system of claim 3, whereby the decision unit advances the signal phase if one of said plurality of values crosses said rejection threshold.

6. The system of claim 1, wherein the despreader includes a RAKE, and the decision unit calculates said value in accordance with at least a sample of the output of said RAKE.

7. The system of claim 1, whereby the transmitted signal comprises a plurality of time slots separated by a plurality of time slot boundaries and each time slot includes a time slot update period, and the background noise estimator obtains said background noise estimation during said update period.

8. The system of claim 7, whereby the time slot update period occurs substantially immediately after the time slot boundary.

9. The system of claim 8, whereby said decision unit calculates said value during a selected time slot in accordance with a background noise estimation obtained only during said update period.

10. A system for receiving a signal transmitted by a communication unit wherein the transmitted signal includes a plurality of short codes, and the communication unit repetitively transmits at least one short code which is periodically updated, the system comprising:

a background noise estimator for obtaining a background noise estimation using the same periodically updated short code;

means for utilizing said background noise estimation to adjust a likelihood ratio in accordance with the transmitted signal; and a comparator for comparing said likelihood ratio with a predetermined threshold to determine whether said likelihood ratio exceeds said predetermined threshold.

11. The system of claim 10, whereby the comparator further compares said ratio with a plurality of predetermined thresholds, whereby at least one of said predetermined thresholds is an acceptance threshold and at least one of said predetermined thresholds is a rejection threshold.

12. The system of claim 11, whereby the transmitted signal has a plurality of signal phases, and whereby the comparator compares a plurality of ratios, corresponding to the plurality of signal phases, with the plurality of predetermined thresholds.

13. The system of claim 12, whereby the comparator advances the signal phase if one of said plurality of ratios crosses one of said plurality of predetermined thresholds.

14. The system of claim 13, whereby the comparator advances the signal phase if one of said plurality of likelihood ratios crosses said rejection threshold.

15. The system of claim 10, further comprising a RAKE, wherein the comparator utilizes the output of said RAKE and calculates said ratio in accordance with at least a sample of said output of said RAKE.

16. The system of claim 10, whereby the transmitted signal comprises a plurality of time slots separated by a plurality of time slot boundaries and each time slot includes a time slot update period, and the background noise estimator obtains said background noise estimation during said update period.

17. The system of claim 16, whereby the time slot update period occurs substantially immediately after the time slot boundary.

18. The system of claim 17, whereby said comparator calculates said ratio during a selected time slot in accordance with a background noise estimation obtained only during said update period.

* * * * *